(12) United States Patent
Wurmfeld et al.

(10) Patent No.: US 11,087,325 B2
(45) Date of Patent: Aug. 10, 2021

(54) SYSTEMS AND METHODS FOR ACTIVE SIGNATURE DETECTION

(71) Applicant: Capital One Services, LLC, McLean, VA (US)

(72) Inventors: David Wurmfeld, Falls Church, VA (US); Tyler Locke, Jersey City, NJ (US); James Zarakas, Centreville, VA (US); Adam Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 9 days.

(21) Appl. No.: 16/571,639

(22) Filed: Sep. 16, 2019

(65) Prior Publication Data

US 2020/0043004 A1 Feb. 6, 2020

Related U.S. Application Data

(63) Continuation of application No. 16/055,420, filed on Aug. 6, 2018, now Pat. No. 10,445,733.

(51) Int. Cl.
| | | |
|---|---|---|
| *G06Q 20/40* | (2012.01) | |
| *G06Q 20/38* | (2012.01) | |
| *H04W 4/80* | (2018.01) | |
| *G06Q 20/32* | (2012.01) | |
| *G06F 21/31* | (2013.01) | |
| *G06F 1/32* | (2019.01) | |

(Continued)

(52) U.S. Cl.
CPC ........... *G06Q 20/4014* (2013.01); *G06F 1/32* (2013.01); *G06F 3/04883* (2013.01); *G06F 21/31* (2013.01); *G06Q 20/32* (2013.01); *G06Q 20/34* (2013.01); *G06Q 20/3825* (2013.01); *H04W 4/80* (2018.02)

(58) Field of Classification Search
CPC .... G06Q 20/4014; G06Q 20/32; G06Q 20/34; G06Q 20/3825; G06Q 20/40; G06Q 20/38; H04W 4/80; G06F 1/32; G06F 3/04883; G06F 21/31; G06F 3/0488
See application file for complete search history.

(56) References Cited

U.S. PATENT DOCUMENTS 6,721,738 B2 4/2004 Verplaetse et al.
7,334,735 B1 2/2008 Antebi et al.
(Continued)

OTHER PUBLICATIONS

Abdulaziz Alzubaidi et al., "Authentication of Smartphone Users Using Behavioral Biometrics," 2016, IEEE Communications Surveys & Tutorials, vol. 18, No. 3, pp. 1998-2026 (Year: 2016).*

*Primary Examiner* — Kenneth Bartley
(74) *Attorney, Agent, or Firm* — Pillsbury Winthrop Shaw Pittman LLP

(57) ABSTRACT

Disclosed embodiments describe a system for completing a transaction using an electronic transaction card by receiving, from a user device executing a software application, a selection of a first account function associated with a financial transaction; determining that the account function requires user verification; detecting, via a motion detection component, a motion pattern performed on the electronic transaction card by the user; authenticating an identity of the user, by the electronic transaction card, based on the detected motion pattern; and completing, by the user device, the financial transaction.

20 Claims, 6 Drawing Sheets

(51) Int. Cl.
*G06Q 20/34* (2012.01)
*G06F 3/0488* (2013.01)

(56) References Cited

U.S. PATENT DOCUMENTS

| | | | |
|---|---|---|---|
| 7,813,822 B1 | 10/2010 | Hoffberg | |
| 7,949,148 B2 | 5/2011 | Rhoads et al. | |
| 7,971,156 B2* | 6/2011 | Albertson | G06F 21/36 |
| | | | 715/863 |
| 8,077,905 B2 | 12/2011 | Rhoads et al. | |
| 8,126,203 B2 | 2/2012 | Rhoads et al. | |
| 8,544,753 B2 | 10/2013 | Antebi et al. | |
| 8,768,249 B2* | 7/2014 | Avadhanam | G06F 3/04883 |
| | | | 455/41.1 |
| 8,923,550 B2 | 12/2014 | Rhoads et al. | |
| 8,983,117 B2 | 3/2015 | Rhoads et al. | |
| 9,361,444 B2 | 6/2016 | Antebi et al. | |
| 9,524,383 B2* | 12/2016 | Davis | G06K 19/0716 |
| 9,978,058 B2* | 5/2018 | Wurmfeld | G06Q 20/354 |
| 9,998,454 B2* | 6/2018 | Davis | G06F 1/1684 |
| 10,083,438 B2* | 9/2018 | Stern | G06Q 20/354 |
| 10,453,052 B2* | 10/2019 | Wurmfeld | G06K 19/07733 |
| 10,482,453 B2* | 11/2019 | Zarakas | G06Q 20/405 |
| 10,657,518 B2* | 5/2020 | Zarakas | G06K 19/045 |
| 10,706,396 B2* | 7/2020 | Wurmfeld | G06Q 20/3224 |
| 2007/0187505 A1 | 8/2007 | Rhoads et al. | |
| 2007/0211920 A1 | 9/2007 | Rhoads et al. | |
| 2007/0214406 A1 | 9/2007 | Rhoads et al. | |
| 2008/0112596 A1 | 5/2008 | Rhoads et al. | |
| 2008/0170776 A1* | 7/2008 | Albertson | G06F 21/36 |
| | | | 382/154 |
| 2008/0173717 A1 | 7/2008 | Antebi et al. | |
| 2008/0175443 A1 | 7/2008 | Kahn et al. | |
| 2009/0088204 A1* | 4/2009 | Culbert | G06F 3/0346 |
| | | | 455/556.1 |
| 2011/0159850 A1 | 6/2011 | Faith et al. | |
| 2011/0189981 A1 | 8/2011 | Faith et al. | |
| 2011/0208852 A1* | 8/2011 | Looney | G06Q 20/10 |
| | | | 709/223 |
| 2011/0311096 A1 | 12/2011 | Rhoads et al. | |
| 2012/0074222 A1 | 3/2012 | Rhoads et al. | |
| 2012/0124662 A1 | 5/2012 | Baca et al. | |
| 2013/0084797 A1* | 4/2013 | Avadhanam | G06F 3/04883 |
| | | | 455/41.1 |
| 2013/0167221 A1 | 6/2013 | Yukoszavlyev et al. | |
| 2013/0228616 A1 | 9/2013 | Bhosle et al. | |
| 2014/0026213 A1 | 1/2014 | Antebi et al. | |
| 2014/0117094 A1* | 5/2014 | Workley | G06K 19/0715 |
| | | | 235/492 |
| 2014/0118147 A1* | 5/2014 | Davis | G06F 1/1684 |
| | | | 340/572.1 |
| 2015/0006378 A1* | 1/2015 | Blythe | G06Q 20/354 |
| | | | 705/41 |
| 2015/0012426 A1 | 1/2015 | Purves et al. | |
| 2015/0181111 A1* | 6/2015 | Stewart | H04N 5/23219 |
| | | | 348/211.8 |
| 2015/0213351 A1 | 7/2015 | Wyatt | |
| 2016/0063484 A1 | 3/2016 | Carpenter et al. | |
| 2016/0307082 A1* | 10/2016 | Wurmfeld | G06K 19/0716 |
| 2016/0307089 A1* | 10/2016 | Wurmfeld | G06Q 20/352 |
| 2016/0307189 A1 | 10/2016 | Zarakas et al. | |
| 2017/0046687 A1* | 2/2017 | Stern | G06Q 20/3415 |
| 2017/0111348 A1* | 4/2017 | Davis | G06F 21/31 |
| 2017/0154328 A1* | 6/2017 | Zarakas | G06Q 20/204 |
| 2017/0323166 A1 | 11/2017 | Colussi et al. | |
| 2018/0174134 A1 | 6/2018 | Carpenter et al. | |
| 2018/0189776 A1* | 7/2018 | Stern | G07F 7/0813 |
| 2019/0052620 A1* | 2/2019 | Davis | G06F 21/35 |
| 2019/0114623 A1* | 4/2019 | Wurmfeld | G06K 19/045 |
| 2019/0385149 A1* | 12/2019 | Wurmfeld | G06K 19/045 |
| 2020/0043004 A1* | 2/2020 | Wurmfeld | G06F 1/3293 |
| 2020/0082380 A1* | 3/2020 | Zarakas | G06K 19/07733 |
| 2020/0234281 A1* | 7/2020 | Zarakas | G06K 19/07722 |

* cited by examiner

SYSTEMS AND METHODS FOR ACTIVE SIGNATURE DETECTION

RELATED APPLICATIONS

This application is a continuation of application Ser. No. 16/055,420, filed Aug. 6, 2018, currently pending, the content of which is expressly incorporated herein by reference in its entirety.

TECHNICAL FIELD

The disclosed embodiments generally relate to completing an electronic transaction using an electronic account card and, more particularly, to authenticating an electronic account card containing a motion detection device.

BACKGROUND

Many types of interactions on computer systems, such as authenticated log-ins and other transaction-based processes, are insecure. For example, when attempting to log in to a website on a computer, the website may request a username and password. Anyone with that set of information—be it an authorized user or a nefarious one—may use the website for any purpose. To combat this insecurity, some transactions require multi-factor authentication—often referred to as "what you know and what you have." For example, when logging into a website, the website may request a username/password combination ("what you know") along with a six-digit number displayed on an electronic device ("what you have"). The six-digit number may change every 30 seconds so as to avoid reuse by an unauthorized user. As another example, a credit card may have information stored on it that can enable a credit card processor to know whether the card is physically present in the user's hands. For example, while the card may have a card number printed on the obverse ("what you know") some information may only be present as part of an EMV chip ("what you have"). Certain devices may read information from the EMV chip for contactless authentication of the user. Some devices allow multi-factor authentication using a "what you know" factor and a "what you are," e.g., a biometric such as face recognition, fingerprint verification, and/or iris scan. However, this procedure also lacks the ideal level of security in that a nefarious user may be able to copy the information stored on the card, and verification information on the card may be static. Thus, a nefarious user may copy and repeatedly use the verification information.

Due to these and other drawbacks associated with user authentication, a user may choose not to use his transaction card as a means of authentication with a mobile device. Therefore, a need exists for technology allowing for, among other things, a secure and efficient authentication of a user of a transaction card.

SUMMARY

Consistent with disclosed embodiments, systems and methods for authenticating a user with a mobile device are provided.

In one embodiment, a system for completing a transaction using an electronic transaction card may include: a memory device storing instructions; and a processor configured to execute the instructions to: receive, from a user device executing a software application, a selection of a first account function associated with a financial transaction; determine that the account function requires user verification; detect, via a motion detection component, a motion pattern performed on the electronic transaction card by the user; authenticate an identity of the user, by the electronic transaction card, based on the detected motion pattern; and complete, by the user device, the financial transaction.

In another embodiment, a method for completing a transaction using an electronic transaction card may include: receiving, from a user device executing a software application, a selection of a first account function associated with a financial transaction; determining that the account function requires user verification; detecting, via a motion detection component, a motion pattern performed on the electronic transaction card by the user; authenticating an identity of the user, by the electronic transaction card, the user based on the detected motion pattern; and completing, by the user device, the financial transaction.

In another embodiment, a non-transitory computer-readable storage medium may store instructions for completing a transaction using an electronic transaction card, the instructions including: receiving, from a user device executing a software application, a selection of a first account function associated with a financial transaction; determining that the account function requires user verification; detecting, via a motion detection component, a motion pattern performed on the electronic transaction card by the user; verifying, by the electronic transaction card, the user based on the detected motion pattern; and completing the financial transaction.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

The present disclosure provides systems and methods for completing a transaction using an electronic transaction card. The electronic transaction card may be associated with a financial account held by the user with a financial service provider and may contain electronic components comprising a motion detection device, power source, and electronic memory device. A user may configure the memory device of the electronic card to store a unique motion pattern, such that the user may not complete a transaction using the card without first performing a physical manipulation of the card in the configured motion pattern.

The term "transaction card," as used herein, refers to any physical card product that is configured to provide information, such as financial information (e.g., card numbers, account numbers, account balance, etc.), quasi-financial information (e.g., rewards balance, discount information, etc.), and/or individual-identifying information (e.g., name, address, etc.), when the card is read by a card reader. Examples of transaction cards include credit cards, debit cards, gift cards, rewards cards, frequent flyer cards, merchant-specific cards, discount cards, etc., but are not limited thereto. The term "transaction card" may include an identification card such as a passport card, a driver's license, an entry point access card, or the like. The physical properties of the transaction card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Additional aspects of the disclosed embodiments are set forth below in this disclosure. Reference will now be made in detail to exemplary embodiments, examples of which are illustrated in the accompanying drawings and disclosed herein. Wherever convenient, the same reference numbers will be used throughout the drawings to refer to the same or like parts. In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Figure 1:
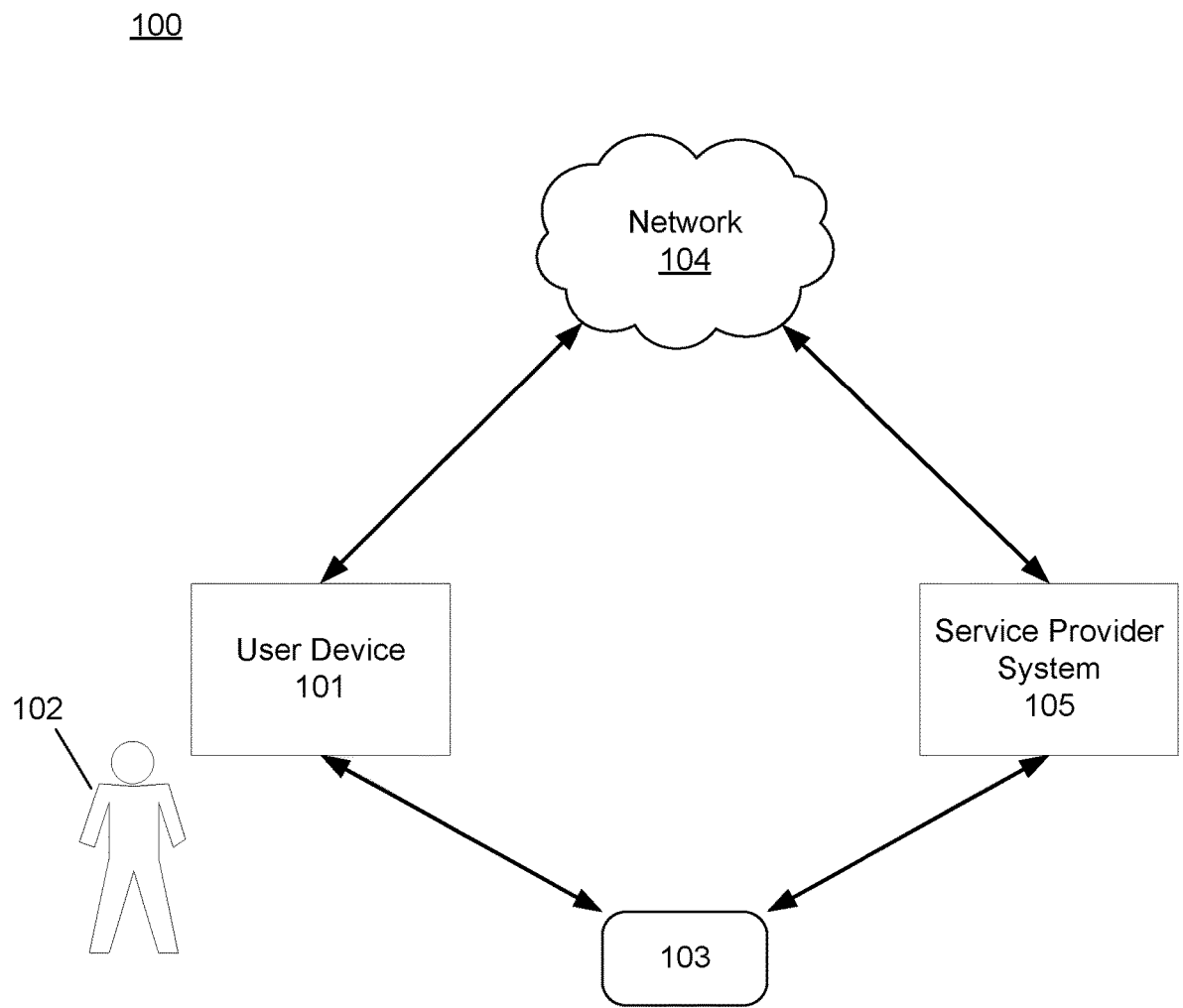
FIG. 1 is a diagram of an exemplary system that may be used to complete a transaction using an electronic transaction card, consistent with disclosed embodiments.

FIG. 1 is a block diagram of an exemplary system 100 for performing operations consistent with the disclosed embodiments. In some embodiments, system 100 may include user device 101, user 102, an electronic transaction card 103, a network 104, and one or more product/service provider systems 105. System 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In some embodiments, user 102 operating a user device 101 may be configured to cause transaction card 103 to detect and store a motion pattern as described below with reference to FIG. 4. User device 101 may also be configured to receive authentication of user 102 from the transaction card 103. User device 101 may be a desktop computer, laptop, tablet, smartphone, multifunctional watch, pair of multifunctional glasses, tracking device, electronic card, electronic wearable device, or any suitable device with computing capability. In some embodiments, user device 101 includes executable software instructions provided as part of an application, or "app," associated with a product/service provider (included as part of 105) for performing operations associated with the product/service provider. A product/service provider may include a financial service provider associated with a financial service account. In some embodiments, the disclosed authentication methods may be performed in association with user 102's interaction with the app or application executed on user device 101. User device 101 is discussed in additional detail with respect to FIG. 2, below.

In some embodiments, user 102 may possess an electronic transaction card 103 associated with a financial service entity. Electronic card 103 may comprise a credit card or debit card, or other membership or identification type card. Electronic card 103 may include certain hardware and software components to detect and store a motion pattern and to verify the motion pattern according to the disclosed embodiments. Electronic transaction card 103 and a component of product/service provider system 105, e.g., an automated teller machine (ATM), may be configured to communicate with each other using one or more wireless protocols (e.g., Near Field Communication (NFC), BLUETOOTH™, BLUETOOTH LE™ (BLE), Radio-Frequency Identification (RFID)). Electronic card 103 is discussed in additional detail with respect to FIG. 3, below.

As further described herein, the disclosed methods may authenticate user 102 operating user device 101, using electronic card 103, etc. to perform a transaction or other interaction with a product/service provider of product/service provider system 105. Product/service provider system 105 may be associated with any entity with which user 102 may communicate or interact with via, for example, user device 101. Product/service provider system 105 may provide functionality associated with a website or other network location accessible to user device 101 executing a browser application, dedicated app, or other program for interacting with product/service provider system 105. In some embodiments, product/service provider system 105 may be associated with a financial service entity that provides, maintains, manages, or otherwise offers financial services accessible via user device 101. In another embodiment, product/service provider system 105 may be a point-of-sale (POS) system at a brick and mortar location or an ATM.

Product/service provider system 105 may include one or more computing devices (e.g., computer(s), server(s), etc.), memory storing data and/or software instructions (e.g., database(s), memory devices, etc.), and other known computing components configured to provide services to and/or interact with other components of system 100 (shown or not shown), such as user device 101, over network 104. In some embodiments, the computing components may include one or more processors configured to execute software instructions stored on one or more memory devices to perform operations consistent with the disclosed embodiments. In some embodiments, product/service provider system 105 may take the form of a server, special purpose computing device, a mainframe computer, or any combination of these components. In certain embodiments, product/service provider system 105 (or a system including product/service provider system 105) may be configured as a particular apparatus, system, and the like based on the storage, execution, and/or implementation of the software instructions that perform one or more operations consistent with the disclosed embodiments. Product/service provider system 105 may be a standalone system, or it may be part of a subsystem, which may be part of a larger system. Product/service provider system 105 may be a single server or may be configured as a distributed computer system including multiple servers or computers that interoperate to perform one or more of the processes and functionalities associated with the disclosed embodiments. The disclosed embodiments are not limited to any particular configuration of product/service provider system 105 or system 100.

Product/service provider system 105 and user device(s) 101 may be configured to communicate with each other over a network 104. In some embodiments, transaction card 103 may be configured to communicate with product/service provider system 105 and/or user device 101 over a network 104. Network 104 may comprise any type of computer networking arrangement configured to provide communications or exchange data, or both, between components of system 100. For example, network 104 may include any type of network (including infrastructure) that provides communications, exchanges information, and/or facilitates the exchange of information, such as the Internet, a private data network, a virtual private network using a public network, a Wi-Fi network, a LAN or WAN network, and/or other suitable connections that may enable information exchange among various components of system 100. Network 104 may also include a public switched telephone network ("PSTN") and/or a wireless cellular network. Network 104 may be a secured network or unsecured network. In some embodiments, one or more components of system 100 may communicate directly through a dedicated communication link(s).

It is to be understood that the configuration of the functional building blocks of system 100 have been defined herein for the convenience of the description. The components and arrangement of the components included in system 100 may vary. For example, in some embodiments, system 100 may include other components that perform or assist in the performance of one or more processes consistent with the disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
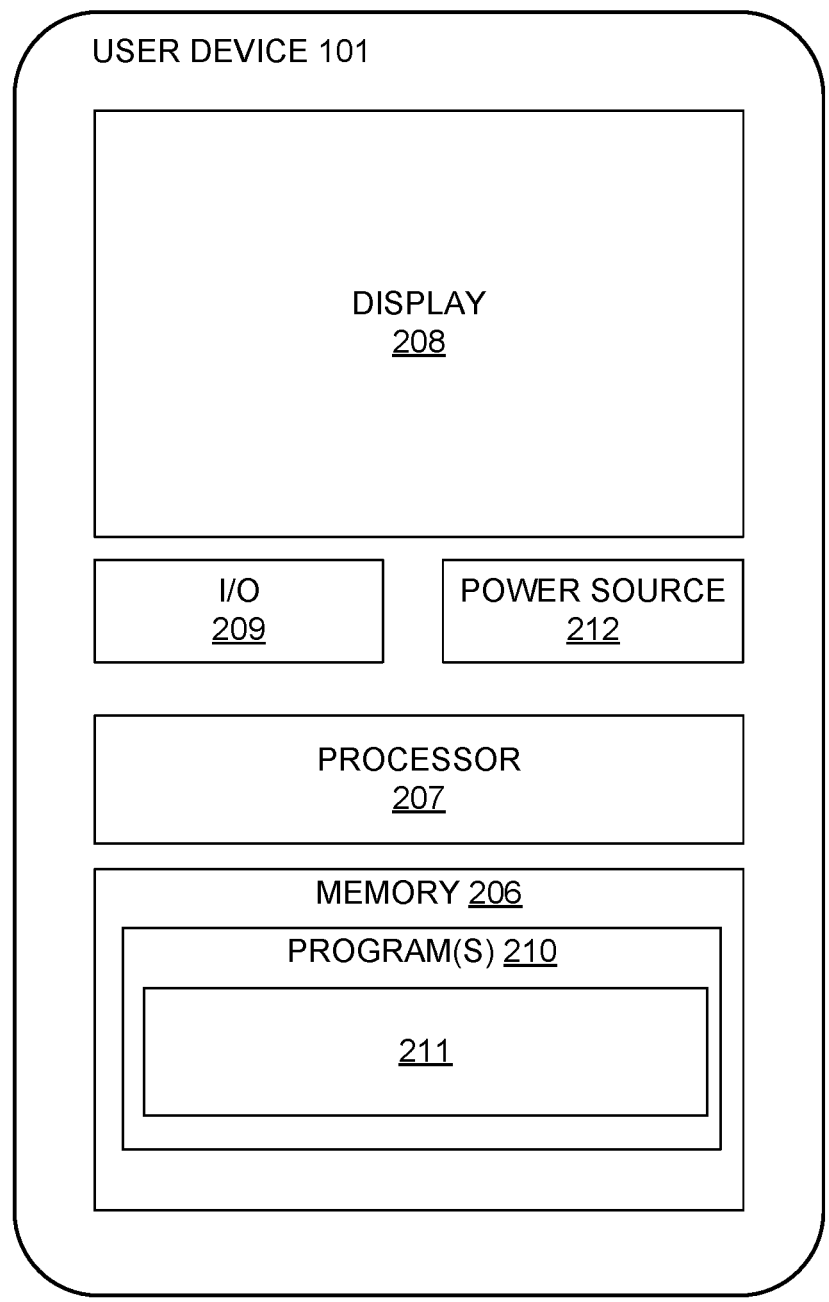
FIG. 2 is a diagram of an exemplary computing device, consistent with disclosed embodiments.

FIG. 2 shows an exemplary configuration of user device 101, consistent with disclosed embodiments. User device 101 may enable a user 131 to operate user device 101 to perform remote interactions or mobile transactions with product/service provider system 110, for example, or receive information from product/service provider system 110. In some embodiments, user device 101 may be a personal computing device. For example, user device 101 may be a smartphone, a laptop or notebook computer, a tablet, or any mobile or wearable device with computing ability, or any combination of these computers and/or affiliated components.

FIG. 2 shows an exemplary configuration of user device 101, consistent with disclosed embodiments. User device 101 may enable a user 102 to operate user device 101 to perform remote interactions or mobile transactions with product/service provider system 105, for example, or receive information from product/service provider system 105. In some embodiments, user device 101 may be a personal computing device. For example, user device 101 may be a smartphone, a laptop or notebook computer, a tablet, or any mobile or wearable device with computing ability, or any combination of these computers and/or affiliated components.

User device 101 may include one or more processors configured to execute software instructions stored in memory, such as memory 206 included in user device 101. User device 101 may include software that when executed by a processor (e.g., processor 207) performs known Internet-related communication, content display processes, and other interactive processes for a user of user device 101. For instance, user device 101 may execute a browser or related mobile display software that generates and displays interfaces including content on a display device 208 included in, or in communication with, user device 101. User device 101 may be a mobile device that executes mobile device applications and/or mobile device communication software that allows user device 101 to communicate with product/service provider system 105 and other components over network 104, and generates and displays content in interfaces via a display device 208 included in user device 101. The disclosed embodiments are not limited to any particular configuration of user device 101. User device 101 may include any arrangement of one or more computing devices configured to perform one or more operations consistent with disclosed embodiments.

User device 101 may be configured with storage that stores one or more operating systems that perform known operating system functions when executed by one or more processors. By way of example, the operating systems may include Microsoft Windows™, Unix™, Linux™, Android™, Apple™ Mac OS operating systems, iOS, Chrome OS, or other types of operating systems. Accordingly, embodiments of the disclosed invention may operate and function with computer systems running any type of operating system. User device 101 may also include communication software that, when executed by a processor, provides communications with network 104, such as Web browser software, tablet or smart handheld device networking software, etc.

User device 101 may include a display 208 for displaying information. Display 208 may include, for example, liquid crystal displays (LCD), light emitting diode screens (LED), organic light emitting diode screens (OLED), a touch screen, and other known display devices. Display 208 may display various information to user 102. For example, display 208 may display an interactive interface to user 102 enabling user 102 to operate user device 101 to perform certain aspects of the disclosed methods. Display 208 may display touchable or selectable options for user 102 to select, and may receive user selection of options through a touch screen or I/O devices 210.

I/O devices 209 may include one or more devices that allow user device 101 to send and receive information or interactions from user 102 or another device. For example, I/O devices 209 may include various input/output devices, such as a keyboard, a mouse-type device, a gesture sensor, an action sensor, a physical button, switch, microphone, touchscreen panel, stylus, etc. that may be manipulated by user 102 to input information using user device 101. I/O devices 209 may also include an audio output device, such as a speaker configured to provide sound and audio feedback to user 102 operating user device 101. In some embodiments, I/O devices 209 may include a light emitting component, such as an LED or other component capable of providing a visible signal to user 102. I/O devices 209 may also include one or more communication modules (not shown) for sending and receiving information from other components in system 100 by, for example, establishing wired or wireless connectivity between user device 101, electronic card 103, and network 104. I/O devices 209 may include a radio frequency, infrared, or other near-field communication interfaces, for communicating with transaction card 103 or other devices associated with user 102. Exemplary communication modules as I/O devices 209 may include, for example, a short-range or near field wireless communication modem, a Wi-Fi communication modem, or a cellular communication modem. In some embodiments, I/O devices 209 may include one or more short-range RFID devices may enable user device 101 to communicate via personal area network, e.g., BLE, NFC, or other short-range communication protocol, with transaction card 103.

User device 101 may include at least one processor 207, which may be one or more known computing processors, such as a microprocessor from the Snapdragon™ family manufactured by Qualcomm™, the Exynos™ family manufactured by Samsung™, or any of various processors manufactured by Apple™, for example. Processor 207 may constitute a single core or multiple core processor that executes parallel processes simultaneously. For example, processor 207 may be a single core processor configured with virtual processing technologies. In certain embodiments, processor 207 may use logical processors to simultaneously execute and control multiple processes. Processor 207 may implement virtual machine technologies, or other known technologies to provide the ability to execute, control, run, manipulate, store, etc. multiple software processes, applications, programs, etc. In another embodiment, processor 207 may include a multiple-core processor arrangement (e.g., dual core, quad core, etc.) configured to provide parallel processing functionalities to allow user device 101 to execute multiple processes simultaneously. One of ordinary skill in the art would understand that other types of processor arrangements could be implemented that provide for the capabilities disclosed herein. The disclosed embodiments are not limited to any type of processor(s) configured in user device 101. Processor 207 may execute various instructions stored in user device 101 to perform various functions of the disclosed embodiments described in greater detail below.

User device 101 may include a memory 206, which may be a volatile or non-volatile, magnetic, semiconductor, optical, removable, non-removable, or other type of storage device or tangible (i.e., non-transitory) computer-readable medium. Memory 206 may store one or more programs 210. Programs 210 may include operating systems (not shown) that perform known operating system functions when executed by one or more processors. Disclosed embodiments may operate and function with computer systems running any type of operating system.

User device 101 may be a device that executes mobile applications for performing operations consistent with disclosed embodiments, such as a tablet, smartphone, or other mobile computing device. Thus, in some embodiments, user device 101 may have an application 211 installed thereon, which may enable user device 101 to communicate with product/service provider system 105 via network 104 and perform aspects of the disclosed methods. For example, user device 101 may connect to product/service provider system 105 through the use of browser software to access and receive information or perform other operations associated with a product/service provider.

For example, in some embodiments, application 211 may provide an instruction to the transaction card 103 to detect a motion pattern during a preconfigured time period and store the detected motion pattern. In other embodiments, user 102 may initiate a transaction via application 211. Upon detecting a transaction, application 211 may instruct the user 102 to authenticate (e.g., by displaying a message on display 208 or playing an audible prompt) at least by performing a physical manipulation of the transaction card 103 Application 211 may provide instructions to transaction card 103 to detect a motion pattern performed by the user 102 on the transaction card 103 and to compare the performed motion pattern to the stored motion pattern. For example, product/service provider system 105 may ask the user device 101 to authenticate the user 102 before completing the transaction. Application 211 may receive the request for authentication from product/service provider system 105 and simultaneously prompt user 102 to perform a physical manipulation of transaction card 103 and prompt the transaction card 103 to begin recording motion data. In another embodiment, application 211 may prompt the user 102 to provide input to cause the application 211 to instruct transaction card 103 to begin collecting motion data. For example, if user device 101 includes a touch-screen, the user may select "Start" via touch-sensitive display 208. In another example, the user 102 may initiate collection of motion data by pressing a button or switch located on the transaction card 103. If the motion patterns match or are substantially similar, the transaction card 103 may communicate with user device 101 to verify user 102. Application 211 may prompt the user 102 to input additional authentication factors including, for example, a username and password, biometric (e.g., fingerprint scan) information, or one-time password. Upon authenticating the user 102 based on the performed motion pattern and one or more additional authentication factors, application 211 may allow the user to complete a transaction. In some embodiments, upon verification of the performed motion pattern the application 211 may provide instructions to automatically complete a transaction. For example, product/service provider system 105 may deny the transaction if the user 102 is not authenticated based on the motion pattern performed on the transaction card 103. In some embodiments, user device 101 may not transmit account information and/or transaction data to product/service provider system 105 without verification of the user 102. A transaction may include, for example, a purchase, money transfer, or payment.

Figure 3:
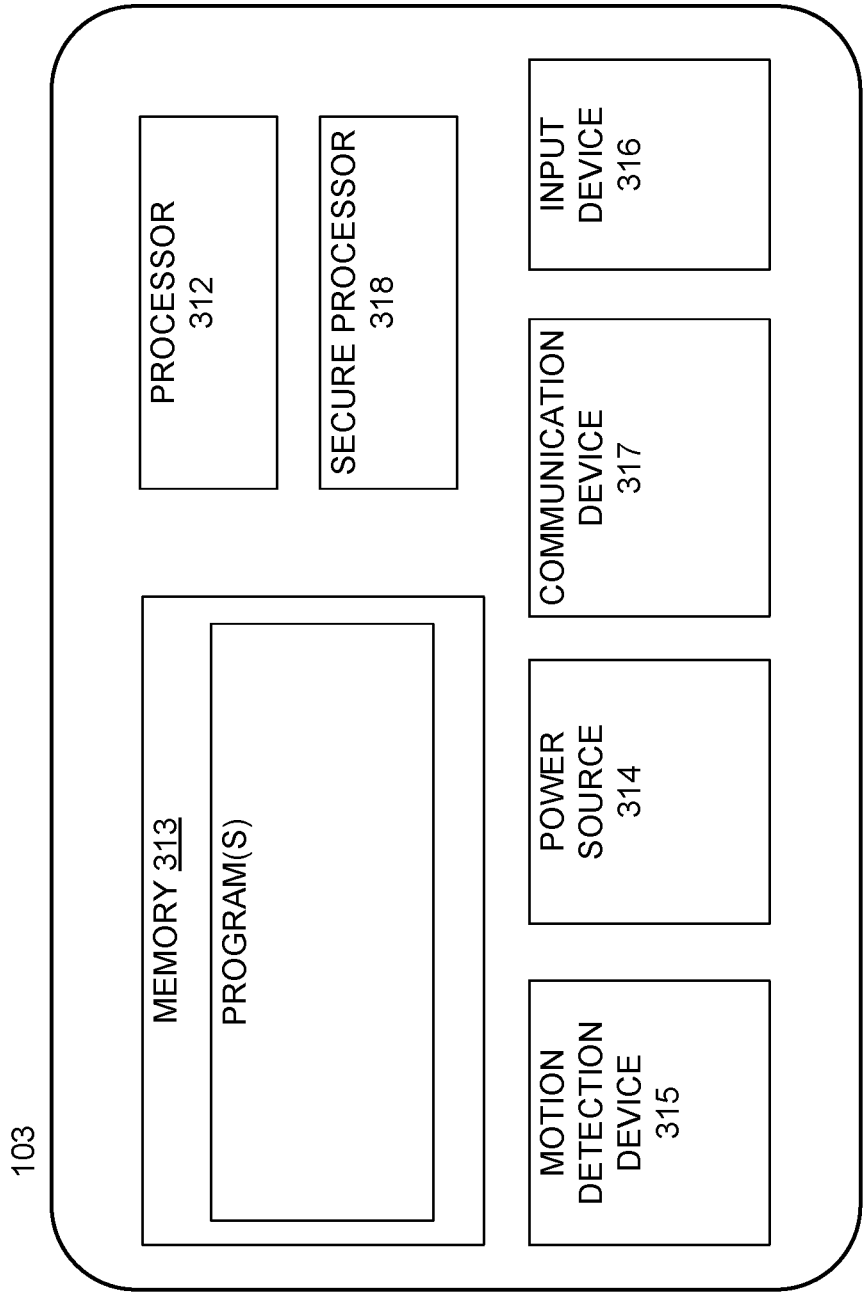
FIG. 3 is a diagram of an exemplary electronic transaction card, consistent with disclosed embodiments.

FIG. 3 shows a diagram of an exemplary electronic card 103, consistent with disclosed embodiments. In some embodiments, electronic card 103 may be the approximate size and shape of a traditional transaction card, such as a credit card. Electronic card 103 may have embedded electronics for performing aspects of the disclosed authentication methods. As shown, electronic card 103 may include processor 312, memory 313, power source 314, motion detection device 315, input device 316, and communication device 317. In some embodiments, electronic card 103 may include a secure processor 318. In some embodiments, transaction card 103 may include a magnetic stripe (not shown) or other transaction component (not shown), for example, an EMV chip. In some embodiments, electronic card 103 may include more or fewer components than shown in FIG. 3.

Processor 312 may comprise one or more known or specialized processing devices, of sufficient size and form factor to fit within electronic card 103 when configured to be about the size of a traditional transaction card. In some embodiments, processor 312 may include any configuration capable of performing functions related to the disclosed methods such as, for example, recording information indicative of a motion pattern detected by motion detection device 315 and/or comparing a detected motion pattern against a motion pattern stored in memory 313. Processor 312 may also control power source 314, send and receive data, read from and write to memory 313, receive and analyze data from motion detection device 315, receive and process input from input device 316, and any other functions consistent with the disclosed embodiments.

Secure processor 318 may comprise one or more known or specialized processing devices, of sufficient size and form factor to fit within electronic card 103 when configured to be about the size of a traditional transaction card. In some embodiments, secure processor 318 may be an IC comprising a processor and memory. Secure processor 318 may ensure a secure medium for storing the motion pattern and/or gait pattern. In some embodiments, the data stored on the secure processor 318 is protected by a public key/private key relationship any time said data is exchanged with the user device 101 or the product/service provider 105.

Memory 313 may include a volatile or non-volatile, magnetic, semiconductor (e.g., EEPROM, flash memory, etc.), tape, optical, removable, non-removable, or other type of storage device or tangible (i.e., non-transitory) computer-readable medium that stores one or more motion and/or gait patterns, user information, and other computer-executable instructions.

Power source 314 may include a power storage device such as a battery or capacitor, a power receiver such as an inductive power coil or a wireless power receiver, a power generator such as a solar or kinetic power generator, or any combination thereof. In some embodiments, power source 314 may include one or more other known devices capable of generating, receiving, and/or storing electrical energy.

Motion detection device 315 may be a sensor configured to detect motion patterns, for example, a multi-axis accelerometer, gyroscope, magnetometer, or any combination thereof. In some embodiments, transaction card 103 may include multiple motion detection devices 315 located on different sides, edges, or faces of transaction card 103 to detect complex motion patterns. In some embodiments, processor 312 may detect motion patterns associated with multiple motion detection devices, such as a sequence of taps on a first side of transaction card 103, followed by a sequence of taps on a second side of transaction card 103. In another embodiment, motion detection device 315 may be configured to sense and store a gait pattern of the user 102. Processor 312 may store one or more detected gait cycles associated with the user. In some embodiments, motion detection device 315 records several gait cycles and the processor 312 calculates and stores an average gait cycle of the user 102.

Input device 316 may include one or more buttons, switches, or other forms of input mechanisms for receiving an indication or instruction from user 102. In some embodiments, input device 316 may receive input from user 102, to cause processor 312 to perform various functions associated with the disclosed embodiments. For example, user 102 may provide input via input device 316 to start and stop motion detection by motion detection device 315.

In some embodiments, transaction card 103 may include communication device 317, for transmitting and/or receiving data from one or more external locations, e.g., from user device 101 and/or product/service provider system 105. Communication device 317 may comprise a short-range wireless transceiver, or a near-field communication chip. For example, communication device 317 may be an NFC antenna, radiofrequency identification (RFID) device, Bluetooth® device, or WiFi device. In some embodiments, communication device 317 may be configured to communicate using an IEEE 802.15.4 protocol, e.g., Zigbee, Thread, etc. Communication device 317 may be configured to communicate with user device 101 or other systems such as a contactless card reader or other sensors configured to detect the presence of transaction card 103.

User device 101 and electronic transaction card 103, described above, are only exemplary devices for authenticating a user according to the disclosed embodiments. Other devices capable of implementing suitable computing components and that may be manipulated by a user may also be used to authenticate a user according to the disclosed embodiments.

The following processes are directed to various embodiments for completing a transaction using an electronic transaction card and authenticating a user with an electronic transaction card. The following processes may be performed by various aspects and components of user device 101, electronic transaction card 103, or product/service provider system 105 as is apparent from the disclosure.

Figure 4:
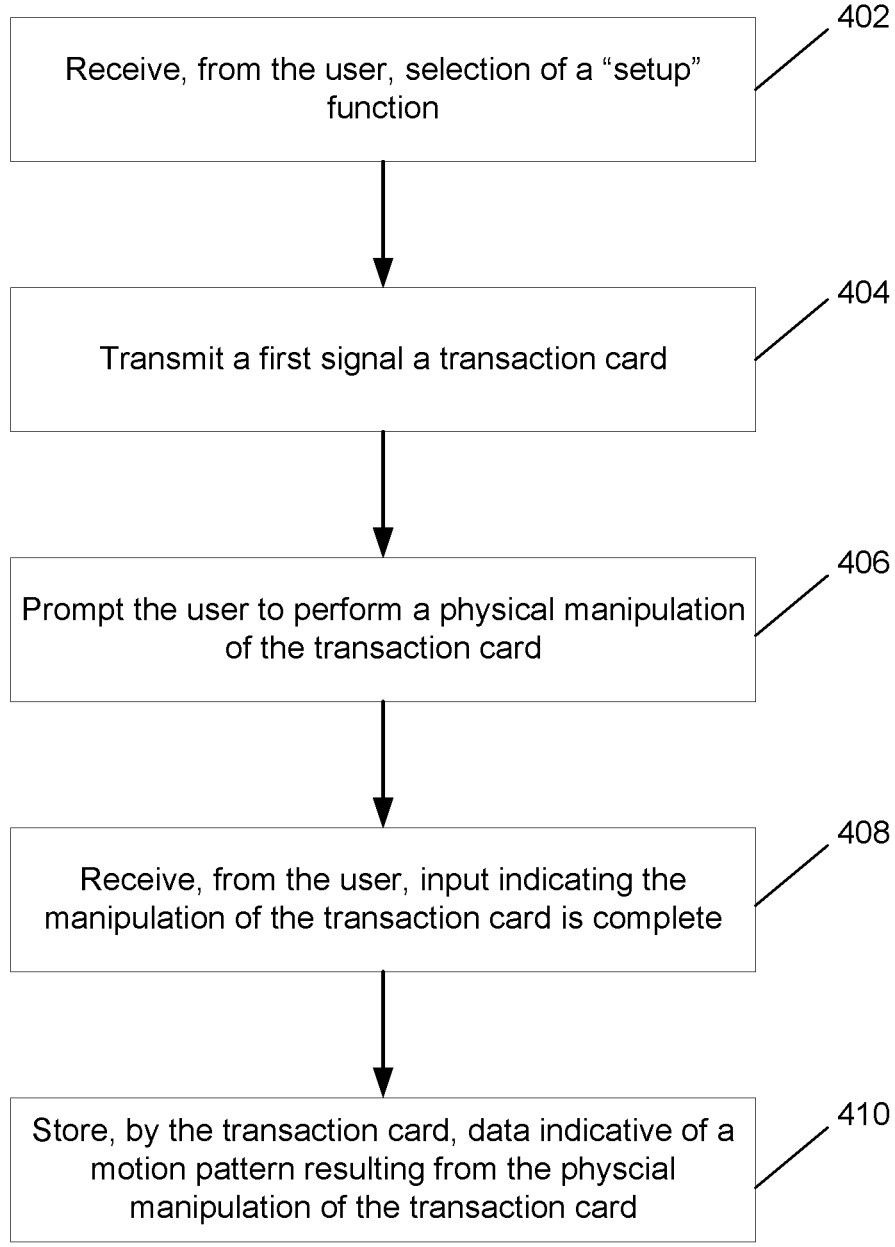
FIG. 4 is a flowchart of an exemplary transaction card configuration process, consistent with disclosed embodiments.

FIG. 4 illustrates a flowchart of a process 400 for configuring a transaction card according to some embodiments. In some embodiments, process 400 may be executed, in part, in conjunction with a user's interaction with an application, such as application 211 executed on user device 101. In some embodiments, the transaction card 103 may store motion patterns associated with a particular application 211 or a particular product/service provider system 105. Thus, in some embodiments, a user may associate certain motion patterns as being unique to application 211, to a particular transaction type, or a particular product/service provider system 105.

At step 402, the user may initiate a transaction card configuration process. For example, the user 102 may select an account or a transaction card setup function of application 211. In some embodiments, the user may be prompted to enter one or more authentication factors, for example, a username and password, transaction card number, account number, and/or biometric information, before application 211 allows the user to store a motion pattern or gait pattern on the transaction card 103.

At step 404, application 211 causes the user device 101 to transmit a signal to transaction card 103. The transmitted signal may include instructions causing the motion detection device 315 to begin collecting and storing motion data.

At step 406, application 211 may prompt the user 102, for example, via display 208, to perform a physical manipulation of the transaction card 103 of the user's choosing. For example, the user 102 may perform a manipulation of the card to be stored as the secret motion pattern to be performed by the user when completing a transaction. Exemplary motion patterns may be a geometric shape, the user's signature performed with the card, a series of taps on various edges of the card, etc. In some embodiments, steps 404 and 406 occur simultaneously.

In another embodiment, at step 406, application 211 may display, to the user, instructions to store the transaction card as the user would normally carry the card and walk for a preconfigured amount of time to allow the motion detection device 315 of transaction card 103 to collect data indicative of the gait pattern of the user. For example, upon receiving said prompt, the user may place the card in a wallet and place the wallet inside a handbag. The prompt may indicate to the user to walk with the card for a period of, for example, two minutes, to allow the card to record a gait pattern of the user. After the preconfigured amount of time has elapsed, processor 312 may cause motion device 315 to stop recording data and may transmit a signal, via communication device 217, to user device 101 indicating that motion data collection has completed. In some embodiments, the processor 312 may collect data indicative of one or more gait cycles of the user and generate data indicative of an average gait cycle.

At step 408, application 211 may receive input from a user indicating the user completed the desired motion pattern. For example, if user device 101 includes a touch-screen, the user may select an "End Recording" function via touch-sensitive display 208 causing the user device 101 to transmit a second signal to transaction card 103 including instructions to cause motion detection device 315 to shut off or to enter a sleep mode and cease collecting motion data. Alternatively, in some embodiments transaction card 103 may include a button, e.g., input device 316, that the user is prompted to press while performing the motion pattern on the transaction card. When the button is released, motion detection device 315 may stop recording motion data and transmit a signal to user device 101 indicating the user has ended the motion detection. In another embodiment, when the detected motion is a gait pattern, motion detection device 315 may stop recording automatically after a preconfigured period of time has elapsed.

In some embodiments, processor 312 may be configured to require a preconfigured minimum number of data points and/or a preconfigured minimum duration of movement of the card. For example, a motion pattern in which the user moves the transaction card vertically for a distance of four inches is not a secure motion pattern and may be rejected by processor 312. In this example, the transaction card 103, via communication device 317, may communicate with user device 101 to instruct application 211 to execute steps 402-408 one or more additional times until the user executes a motion pattern satisfying the minimum requirements for duration and complexity. In other embodiments, user device 101 may display a strength rating of the motion pattern based on the number of data points recorded. In some embodiments, the user may be prompted by the application 211 to complete steps 402-408 by performing the same motion pattern two or more times such that processor 312 may calculate an average motion pattern based on each performed motion pattern.

At step 410, transaction card 103 stores, in memory 313, the motion pattern or gait pattern performed by the user on transaction card 103. In some embodiments, transaction card 103 may transmit, via communication device 317, a signal to user device 101 indicating that the motion or gait pattern has been successfully recorded and stored on transaction card 103.

Figure 5:
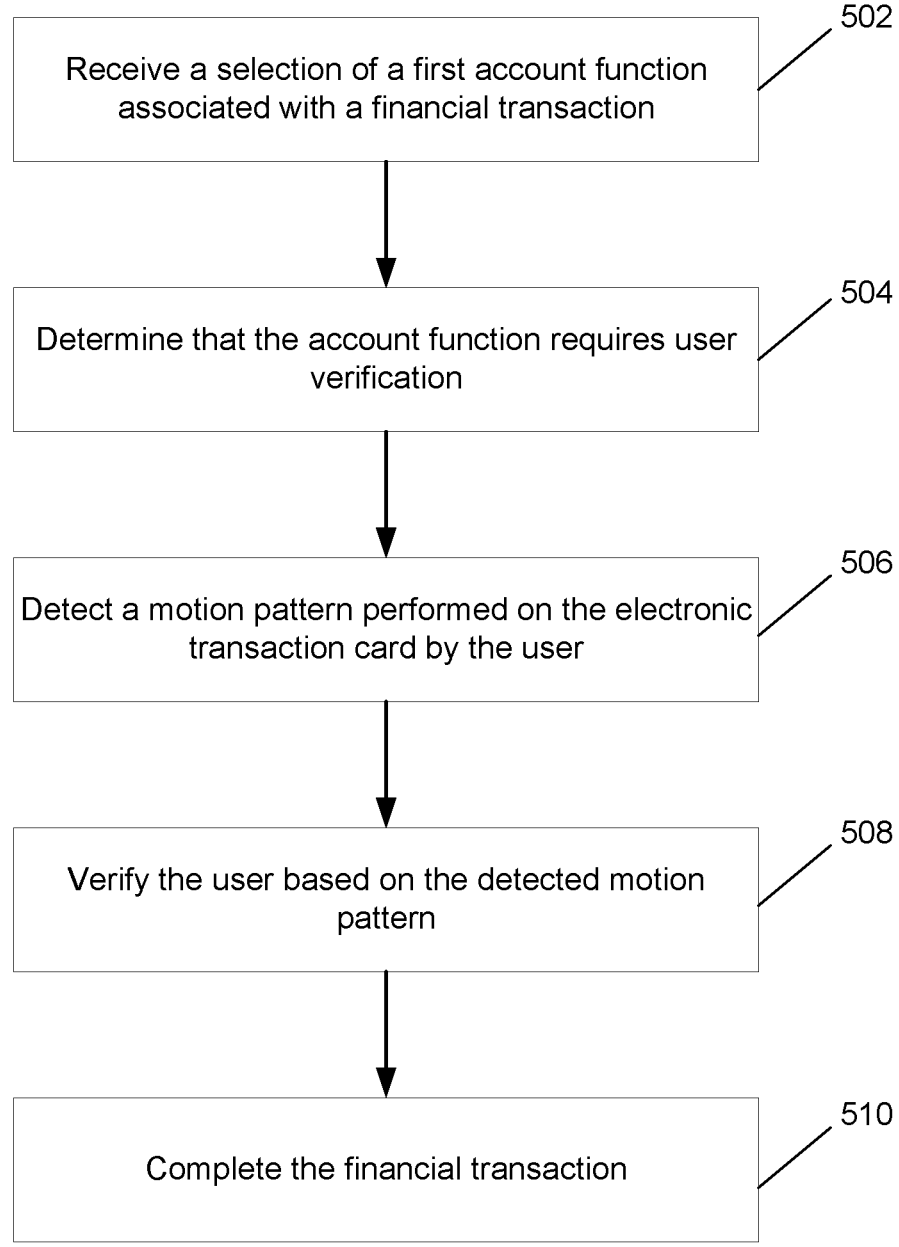
FIG. 5 is a flowchart of an exemplary authentication process, consistent with disclosed embodiments.

FIG. 5 illustrates a flow chart of a process 500 for completing a transaction using an electronic transaction card according to some embodiments. In some embodiments, process 500 may be executed, in part, in conjunction with a user's interaction with an application, such as application 211 executed on user device 101. In some embodiments, the transaction card 103 may store motion patterns associated with a particular application 211 or a particular product/service provider system 105. Thus, in some embodiments, a user may associate certain motion patterns as being unique to application 211, to a particular transaction type, or a particular product/service provider system 105. Thus, a user may complete a purchase by performing a first motion pattern on the transaction card 103 and may complete a deposit by performing a second motion pattern on the transaction card 103.

At step 502, the processor, e.g., processor 207 of user device 101, may receive a selection of a first account function associated with a financial transaction. For example, the user may open application 211 and select a particular transaction type by navigating through one or more menu options within application 211. In some embodiments, the user may select a transaction type within application 211 and provide one or more transaction details. In another embodiment, application 211 may receive one or more transaction details via I/O device 209.

At step 504, the processor determines that the account function requires verification. In some embodiments, application 211 may require verification of the user's identity when the application is opened. Before completing the transaction, application 211 may prompt the user to provide identity verification.

At step 506, motion detection device 315 of the electronic transaction card 103 may detect a physical manipulation of the transaction card 103 performed by the user. The user may be prompted via display 208 of device 101 to perform the motion pattern. In some embodiments, the user may press a button, e.g., input device 316, to initiate motion detection device 315 to begin detecting a physical manipulation of the card 103. The user may press the button to cause the motion detection device 315 to stop collecting data. In some embodiments, motion detection device 315 may detect physical manipulation of the transaction card 103 at a variable sampling rate. For example, motion detection device 315 may be constantly sampling at a low rate (e.g., 10-50 Hz) to detect simple motions and gestures while conserving power. Upon detection of a simple motion, the detection device may then relay a signal to the main processor 312 to 'wake up' or enter its full power runtime state. After receiving a motion interrupt, i.e., the simple motion, from motion detection device 315, the main processor 312 may send a signal to motion detection device 315 to increase the sampling rate, for example, to 200 Hz or greater. With the sampling rate increased, the processor 312 may receive a high resolution of motion data from device 315 enabling processor 312 to receive data indicative of more sophisticated gestures and patterns. Once the authentication and/or transaction is completed, processor 312 may send a signal to motion detection device 315 to return to the lower sampling rate, thus causing the transaction card 103 to conserve power.

At step 508, processor 312 of transaction card 103 receives data indicative of a physical manipulation of the card 103 from motion detection device 315. Processor 312 may compare the received data to a stored motion pattern and verify the user based on the detected motion pattern. For example, processor 312 may verify the user if the detected motion pattern is the same as the stored motion pattern. In some embodiments, processor 312 may verify the user if the detected motion pattern is within a threshold, for example, if the data indicative of the detected motion pattern is a 98% match to the data defining the stored motion pattern. If the motion patterns match, processor 312 may cause communications device 317 to transmit data to user device 101 indicating the user is verified.

In some embodiments, the user may have a number of attempts to complete the motion pattern to be verified. If the user executes a motion pattern not matching the stored motion pattern, application 211 may lock the user account from completing any transactions or may prompt the user to complete one or more additional authentication activities.

At step 510, processor 207 completes the transaction initiated by the user of device 101. For example, upon verification of the user, user device 101 may transmit the account information of the user and/or the transaction details to product/service provider system 105. In another embodiment, product/service provider system 105 may request verification of the user from user device 101. If the user is authenticated based on performance of steps 502-508 described above, user device 101 may communicate with product/service provider 105 indicating that the user was successfully verified. After receiving said communication, product/service provider system 105 may complete the requested transaction.

Figure 6:
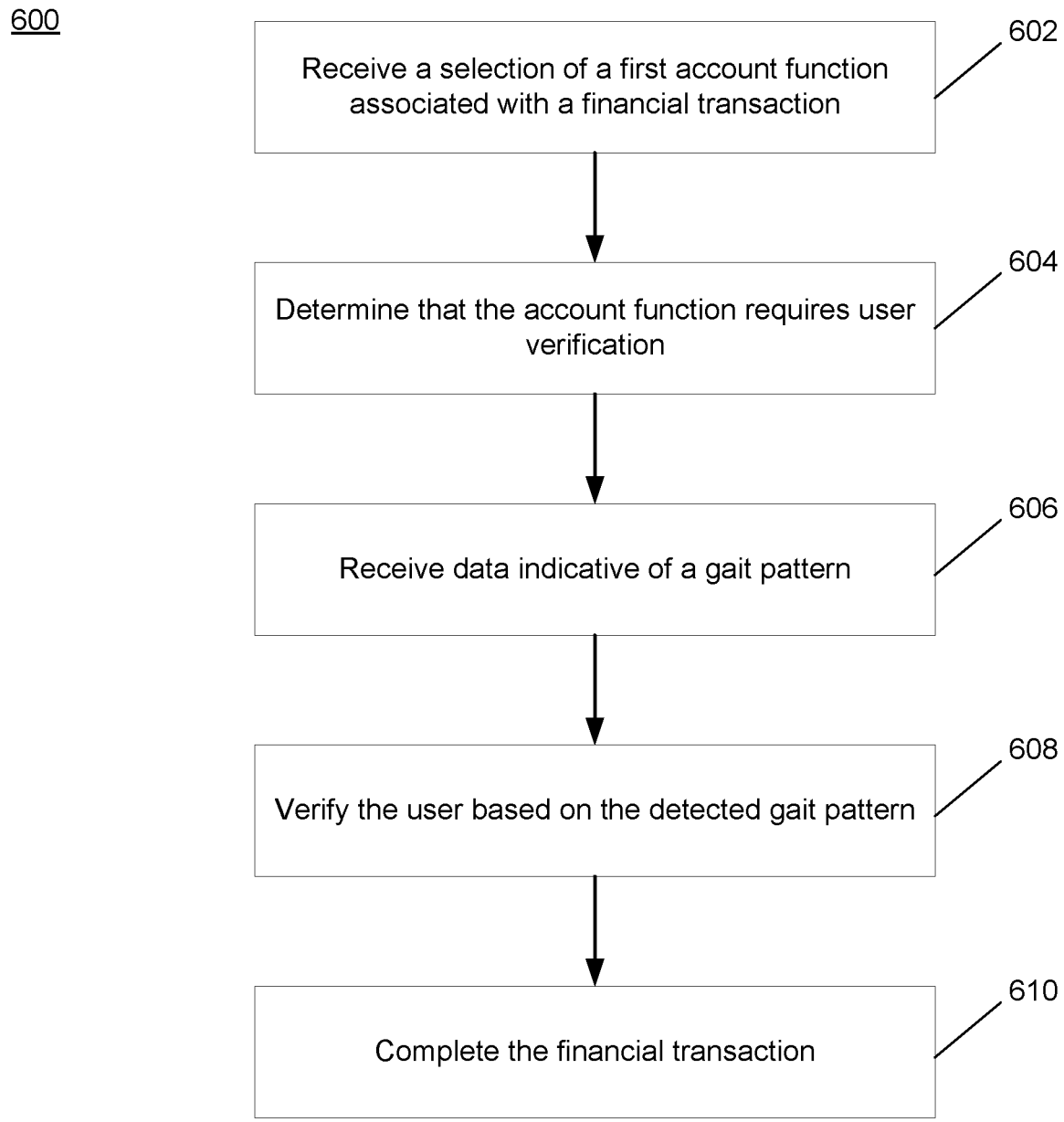
FIG. 6 is a flowchart of an exemplary authentication process, consistent with disclosed embodiments.

FIG. 6 illustrates a flow chart of a process 600 for completing a transaction using an electronic transaction card according to some embodiments. In some embodiments, process 600 may be executed, in part, in conjunction with a user's interaction with an application, such as application 211 executed on user device 101. In some embodiments, the transaction card 103 may store a gait pattern comprised of one or more gait cycles of the user.

At step 602, the processor, e.g., processor 207 of user device 101, may receive a selection of a first account function associated with a financial transaction. For example, the user may open application 211 and select a particular transaction type by navigating through one or more menu options within application 211.

At step 604, the processor determines that the account function requires verification. In some embodiments, application 211 may require verification of the user's identity when the application is opened. In another embodiment, a user may select a transaction type within application 211 and provide one or more transaction details. In another embodiment, application 211 may receive one or more transaction details via I/O device 209. Before completing the transaction, application 211 may prompt the user to provide identity verification.

At step 606, motion detection device 315 of the electronic transaction card 103 may detect a gait pattern of the user. For example, motion detection device 315 may collect motion data while the transaction card 103 is in a pocket or a purse of the user. Collected data may temporarily be stored in memory 313. In other embodiments, a certain motion, such as the initial movement of a gait cycle, may initiate motion detection device to start collecting data. In some embodiments, gait data may be collected by motion detection device 315 at a low (e.g., 10-50 Hz) sampling rate.

At step 608, processor 312 verifies the user based on the detected gait pattern. When the user selects a transaction, via device 101, I/O device 209 may communicate with transaction card 103 to cause processor 312 to compare collected gait pattern data with stored gait pattern data. If the gait patterns match, processor 312 may cause communications device 317 to transmit data to user device 101 indicating the user is verified. If the detected gait pattern does not match the stored gait pattern, application 211 may prompt the user to complete one or more additional authentication activities.

In some embodiments, processor 312 may compare an average gait cycle to the detected gait cycle, or an average gait cycle based on one or more detected gait cycles. The gait cycles may be considered a match if, for example, the average detected gait cycle and average stored gait cycle match within a preconfigured margin of error. In some embodiments, when comparing gate data, processor 312 may execute an algorithm comparing data on each axis such as threshold (g-forces), movement durations, and time between movements, etc.

At step 610, processor 207 completes the transaction initiated by the user of device 101. For example, upon verification of the user, user device 101 may transmit the account information of the user and/or the transaction details to product/service provider system 105. In another embodiment, product/service provider system 105 may request verification of the user from user device 101. If the user is authenticated based on performance of steps 602-608 described above, user device 101 may communicate with product/service provider 105 indicating that the user was successfully verified. After receiving said communication, product/service provider system 105 may complete the requested transaction.

In another embodiment, processes 400 and 500 may be initiated by a POS or by an ATM communicating with transaction card 103. For example, the user may initiate a withdrawal at an ATM. Before completing the withdrawal, the ATM may prompt the user to complete a motion pattern. If the user is verified by processor 312, communications device 317 may transmit a signal instruction the ATM to complete the withdrawal. In some embodiments, transaction card 103 may communicate through a primary account number (PAN) or through direct contact through an EMV terminal of, for example, a POS or ATM, using an EMV chip of the transaction card 103.

The exemplary disclosed embodiments describe systems and methods for authenticating a user with a transaction card comprising a polymorphic tag. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM.

It is intended, therefore, that the specification and examples be considered as example only, with a true scope and spirit being indicated by the following claims and their full scope of equivalents.

What is claimed is:

1. A system for facilitating transaction card power savings, the system comprising:
a memory device storing instructions; and
a processor configured to execute the instructions to:
initiate wireless communication with a transaction card at a first time, wherein the transaction card is operating at a first sampling rate at the first time in a first power state;
wirelessly transmit, to the transaction card at a second time, activation instructions to activate collection of motion pattern data, wherein the transaction card collects motion pattern data at a second sampling rate greater than the first sampling rate, wherein the transaction card operates at the second sampling rate in a second power state higher than the first power state;
display, via a user interface, a prompt instructing a user to execute a motion pattern with the transaction card;
wirelessly receive, from the transaction card, an indication based on a comparison, by the transaction card, of the executed motion pattern with stored motion pattern data, wherein the executed motion pattern is detected by the transaction card while the transaction card is operating at the second sampling rate in the second power state;
based on the indication, provide instructions to a service provider system to complete the transaction; and
wirelessly transmit, to the transaction card, deactivation instructions to deactivate collection of motion pattern data, wherein the transaction card returns from operating at the second sampling rate to operating at the first sampling rate, wherein the transaction card operates at the first sampling rate in the first power state.

2. The system of claim 1, wherein the motion pattern represents a shape, a series of taps on one or more edges of the transaction card, or a signature.

3. The system of claim 1, wherein the motion pattern is configured by the user.

4. The system of claim 1, wherein initiating the wireless communication comprises initiating the wireless communication with the transaction card via a near-field communication (NFC) protocol.

5. The system of claim 1, wherein the activation causes a motion detection device of the transaction card to switch from operating in the first power state to operating in the second power state.

6. The system of claim 5, wherein the deactivation causes the motion detection device of the transaction card to switch from operating in the second power state to operate in the first power state.

7. The system of claim 1, wherein the processor is further configured to execute the instructions to:
display, via the user interface, a second prompt instructing the user to repeat the motion pattern with the transaction card.

8. The system of claim 1, wherein the indication corresponds to a determination that the executed motion pattern matches the stored motion pattern data.

9. The system of claim 1, wherein the processor is further configured to execute the instructions to:
receive, from the service provider system, an authentication request associated with the transaction.

10. A method comprising:
initiating, by one or more processors, communication with a transaction card at a first time, wherein the transaction card is operating at a first sampling rate at the first time in a first power state;
transmitting, by one or more processors, to the transaction card at a second time, activation instructions to activate collection of motion pattern data, wherein the transaction card collects motion pattern data at a second sampling rate greater than the first sampling rate, wherein the transaction card operates at the second sampling rate in a second power state higher than the first power state;
displaying, by one or more processors, via a user interface, a prompt instructing a user to execute a motion pattern with the transaction card;
receiving, by one or more processors, from the transaction card, an indication based on a comparison, by the transaction card, of the executed motion pattern with stored motion pattern data, wherein the executed motion pattern is detected by the transaction card while the transaction card is operating at the second sampling rate in the second power state;
based on the indication, providing, by one or more processors, instructions to a service provider system to complete the transaction; and
transmitting, by one or more processors, to the transaction card, deactivation instructions to deactivate collection of motion pattern data, wherein the transaction card returns from operating at the second sampling rate to operating at the first sampling rate, wherein the transaction card operates at the first sampling rate in the first power state.

11. The method of claim 10, wherein the motion pattern represents a shape, a series of taps on one or more edges of the transaction card, a signature, or gait pattern associated with the user.

12. The method of claim 10, wherein the motion pattern is configured by the user.

13. The method of claim 10, wherein initiating the communication comprises initiating the communication with the transaction card via a near-field communication (NFC) protocol.

14. The method of claim 10, wherein the activation causes a motion detection device of the transaction card to switch from operating in the first power state to operating in the second power state.

15. The method of claim 14, wherein the deactivation causes the motion detection device of the transaction card to switch from operating in the second power state to operating in the first power state.

16. The method of claim 10, further comprising:
displaying, via the user interface, a second prompt instructing the user to repeat the motion pattern with the transaction card.

17. The method of claim 10, wherein the indication corresponds to a determination that the executed motion pattern matches the stored motion pattern data.

18. The method of claim 10, further comprising receiving, from the service provider system, an authentication request associated with the transaction.

19. One or more non-transitory computer-readable media comprising instructions that, when executed by one or more processors, cause operations comprising:
initiating communication with a transaction card at a first time, wherein the transaction card is operating at a first sampling rate at the first time in a first power state;
transmitting, to the transaction card at a second time, activation instructions to activate collection of motion pattern data, wherein the transaction card collects motion pattern data at a second sampling rate greater than the first sampling rate, wherein the transaction card operates at the second sampling rate in a second power state higher than the first power state;

displaying, via a user interface, a prompt instructing a user to execute a motion pattern with the transaction card;

receiving, from the transaction card, an indication based on a comparison, by the transaction card, of the executed motion pattern with stored motion pattern data, wherein the executed motion pattern is detected by the transaction card while the transaction card is operating at the second sampling rate in the second power state;

based on the indication, providing instructions to a service provider system to complete the transaction; and transmitting, to the transaction card, deactivation instructions to deactivate collection of motion pattern data, wherein the transaction card returns from operating at the second sampling rate to operating at the first sampling rate, wherein the transaction card operates at the first sampling rate in the first power state.

20. The one or more non-transitory computer-readable media of claim 19, wherein the motion pattern represents a shape, a series of taps on one or more edges of the transaction card, a signature, or gait pattern associated with the user.

* * * * *